UNITED STATES PATENT OFFICE.

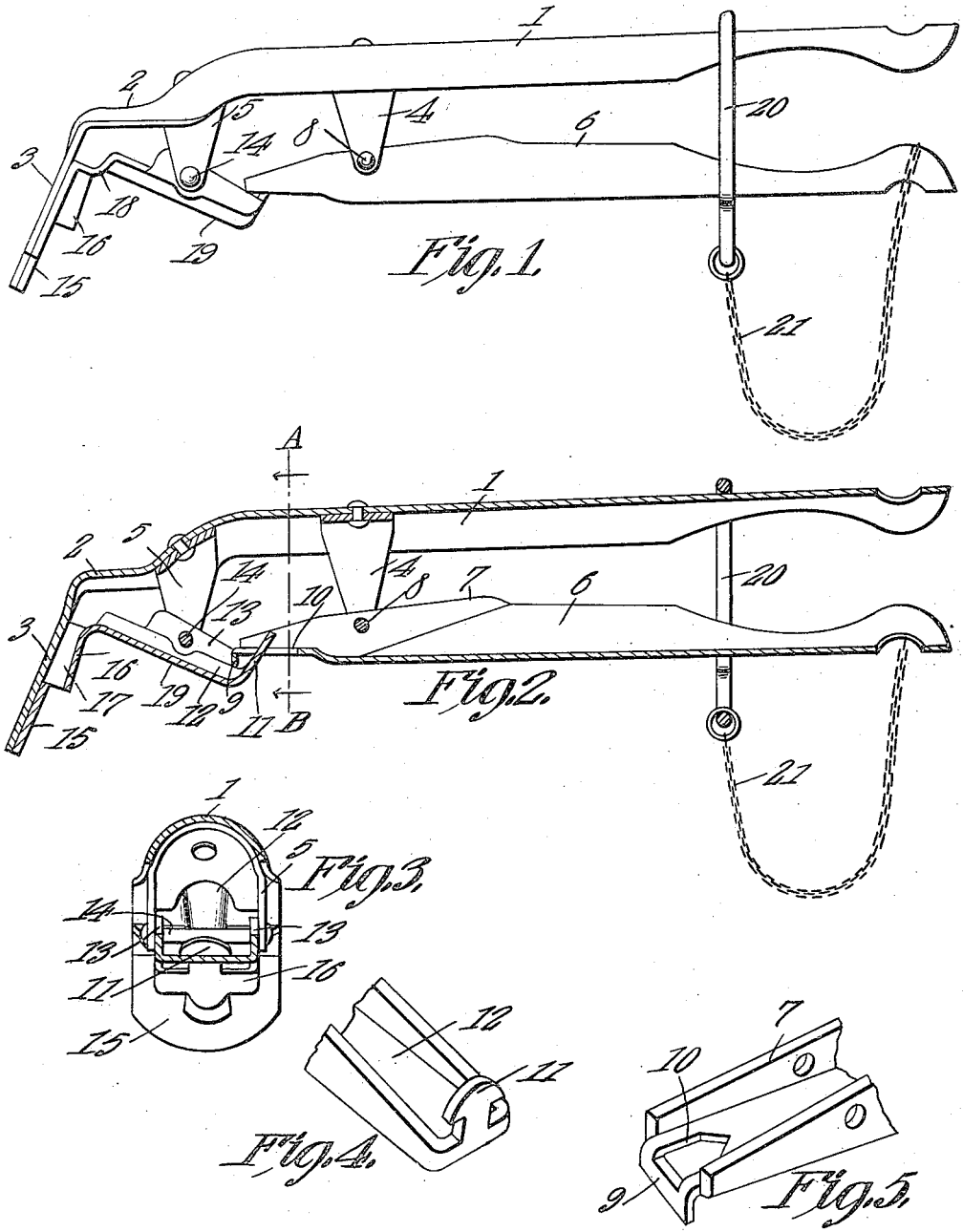

ROBERT F. SALISBURY, OF NEW KENSINGTON, PENNSYLVANIA.

DETACHABLE HANDLE FOR UTENSILS.

1,243,880.      Specification of Letters Patent.      Patented Oct. 23, 1917.

Application filed June 19, 1915. Serial No. 34,997.

*To all whom it may concern:*

Be it known that I, ROBERT F. SALISBURY, a citizen of the United States, residing at New Kensington, in the county of Westmoreland and State of Pennsylvania, have invented a new and useful Detachable Handle for Utensils, of which the following is a specification.

This invention relates to a detachable handle for utensils, one of its objects being to provide a handle which is adapted for use in connection with a utensil whether or not the same is provided with a finishing bead along the upper edge thereof, the parts of the handle being so constructed and located that it is possible to make all of the parts of the device of broad strips of metal, thus rendering the handle more durable than those structures necessarily employing heavy wire or the like in their construction.

A further object is to provide a detachable handle having combined with it means whereby it can be secured to a utensil without falling from position thereon when released by the user.

Another object is to provide a handle which can constitute a connection between a utensil and a wooden stick or the like when it is desired to have a long handle, as for example, while cooking over a camp fire.

A further object is to provide a detachable handle which does not utilize crossed members but, instead, has a jointed handle member whereby when the two grips of the handle are drawn toward each other, the utensil placed between the jaws of the handle will be tightly held.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a side elevation of the handle, the jaws being shown fastened together.

Fig. 2 is a longitudinal section through the structure.

Fig. 3 is a section on line A—B Fig. 2.

Fig. 4 is a detail view of one of the members of the jointed section of the handle.

Fig. 5 is a perspective view of one end portion of the other section of the jointed member.

Referring to the figures by characters of reference 1 designates the top member of the handle, the same being preferably bowed transversely and offset downwardly at one end, as at 2, where it merges into a flat jaw 3 inclined relative thereto.

Depending from the sides of the member 1 are pairs of ears 4 and 5 to which are pivotally connected the respective sections of the other member of the handle. The section 6 is formed of an elongated strip preferably bowed transversely and having its side edges bent adjacent one end to form substantially parallel flanges 7 through which a pivot rod 8 extends, this rod being secured to the ears 4. A lip 9 is bent downwardly from one end of the section 6 and formed in said section and close to the lip is an angular opening 10 as shown particularly in Fig. 5. This opening is adapted to receive a T-shaped tongue 11 extending at an angle from one end of the other section 12 of the jointed handle member, this section 12 being provided with side flanges 13 engaging a cross rod or pin 14 secured to the ears 5. Section 12 merges at one end into a jaw 15 adapted to rest flat against the jaw 3 and provided with an outstruck nose 16 forming a recess 17 in the active face of the jaw. A transverse offset or depression 18 is provided along the angle where the jaw 15 and the remaining portion of the section 12 come together, and a longitudinal reinforcing rib 19 is preferably pressed from the section 12 between jaw 15 and the tongue 11.

A ring 20 is loosely mounted on the two members of the handle and may be connected to one of the handle members by a chain 21 or the like. This ring is designed to frictionally engage the handle members to hold the jaws 3 and 15 pressed tightly together or against the wall of a utensil inserted between them.

It will be understood that by providing the transverse offset 18, the jaws 3 and 15 can receive between them the wall of a utensil having a finishing bead, the bead being adapted to extend into the space formed by the offset. The recess 17 is adapted to receive a projection or lip such as is found upon straps secured to some forms of utensils having detachable handles.

By connecting the sections of the jointed handle member as pointed out, it will be obvious that when the section 6 is drawn toward the section 1, the section 12 will be swung about its pivot pin 14 so as to move the jaw 15 to active position. When the section 6 is released, it will move downwardly by gravity and will thus swing the jaw 15 away from the jaw 3 without any further movement on the part of the user.

By providing transversely bowed members, a wooden handle can be inserted between said members and the ring 20 shifted longitudinally so as to bind the members upon the handle and at the same time move the jaws toward each other so as to bind upon the wall of the utensil inserted between the jaws.

Should it be desired to leave the handle fastened to a utensil, the ring 20 should be shifted longitudinally of the handle members so as to secure the jaws 3 and 15 against relative movement after being clamped upon the wall of the utensil or receptacle.

While the ears 4 and 5 have been shown formed in separate pieces secured to the member 1, it is to be understood that they can be made integral with the member.

It is to be understood that the jaws 3 and 15 can be given any desired transverse or longitudinal contour.

What is claimed is:—

1. In a device of the class described, the combination with a handle member and a jaw at one end thereof and fixed relative thereto, of a section pivotally connected to said member and having an aperture adjacent one end, a second section pivotally connected to said member, a T-shaped tongue extending therefrom and working within the opening, and a jaw integral with said second section.

2. In a device of the class described, a handle member, a jaw depending from the handle member, a gripping member pivoted to the handle member and coöperating with the jaw, said gripping member comprising a plate, a jaw depending from one end thereof, a nose struck out from the jaw, and a tongue rising from the other end of the plate, and another handle member pivoted to the first mentioned handle member, said member having an opening in one end thereof for the reception of the tongue.

In testimony that I claim the foregoing as my own, I have hereto affixed my signature in the presence of two witnesses.

ROBERT F. SALISBURY.

Witnesses:
Jos. T. WEINZIERL,
A. J. HEUTCHYS.

Copies of this patent may be obtained for five cents each, by addressing the "Commissioner of Patents, Washington, D. C."